(12) United States Patent
Espy

(10) Patent No.: US 11,754,431 B2
(45) Date of Patent: Sep. 12, 2023

(54) APPARATUS FOR DETERMINING A VERTICAL POSITION OF AT LEAST ONE INTERFACE BETWEEN A FIRST COMPONENT AND AT LEAST ONE SECOND COMPONENT

(71) Applicant: Roche Diagnostics Operations, Inc., Indianapolis, IN (US)

(72) Inventor: Christopher Espy, Remseck (DE)

(73) Assignee: Roche Diagnostics Operations, Inc., Indianapolis, IN (US)

(*) Notice: Subject to any disclaimer, the term of this patent is extended or adjusted under 35 U.S.C. 154(b) by 0 days.

(21) Appl. No.: 17/660,966

(22) Filed: Apr. 27, 2022

(65) Prior Publication Data

US 2022/0373379 A1 Nov. 24, 2022

(30) Foreign Application Priority Data

May 19, 2021 (EP) .................................... 21174606

(51) Int. Cl.
*G01F 23/292* (2006.01)
*G01N 15/04* (2006.01)
(Continued)

(52) U.S. Cl.
CPC ....... *G01F 23/2921* (2013.01); *G01N 15/042* (2013.01); *G01N 15/05* (2013.01);
(Continued)

(58) Field of Classification Search
CPC .. G01F 23/2921; G01N 15/042; G01N 15/05; G01N 35/04
See application file for complete search history.

(56) References Cited

U.S. PATENT DOCUMENTS

| | | | |
|---|---|---|---|
| 6,195,158 B1* | 2/2001 | Cadell | G01F 23/292 356/432 |
| 6,770,883 B2* | 8/2004 | McNeal | G01N 15/00 250/341.1 |

(Continued)

FOREIGN PATENT DOCUMENTS

| | | |
|---|---|---|
| EP | 2770317 A1 | 8/2014 |
| EP | 2924431 A1 | 9/2015 |

(Continued)

OTHER PUBLICATIONS

European Search Report dated Oct. 29, 2021 in Application No. EP 21174606.0, 2 pp.

*Primary Examiner* — John Fitzgerald
(74) *Attorney, Agent, or Firm* — Roche Diagnostics Operations, Inc.

(57) ABSTRACT

An apparatus for determining a vertical position of at least one interface between a first component and at least one second component, the components comprised as different layers in a sample container. The apparatus comprises a first sensing unit and a first light detector configured to generate a first sensing signal, a second sensing unit comprising a second light detector configured to generate a second sensing signal, a driving unit configured to move the sample container, a position sensing unit configured to output a position sensing signal indicative of a vertical position of the sample container, a vertical position determining unit configured to match the first and the second sensing signal such that first and the second sensing signal correspond to identical vertical positions, and to determine the vertical position of the at least one interface in response to the matched sensing signals and the position sensing signal.

15 Claims, 3 Drawing Sheets

(51) Int. Cl.
    *G01N 15/05*    (2006.01)
    *G01N 35/04*    (2006.01)

(52) U.S. Cl.
    CPC ....... *G01N 35/04* (2013.01); *G01N 2015/045* (2013.01); *G01N 2035/0493* (2013.01)

(56) References Cited

U.S. PATENT DOCUMENTS

| | | | |
|---|---|---|---|
| 6,925,871 B2* | 8/2005 | Frank | G01F 23/2921 |
| | | | 116/227 |
| 7,227,622 B2* | 6/2007 | Itoh | G01N 15/042 |
| | | | 422/63 |
| 7,473,897 B2* | 1/2009 | Braendle | G01N 21/3151 |
| | | | 250/357.1 |
| 9,534,885 B2* | 1/2017 | Klinec | G01N 33/48 |
| 10,514,386 B2* | 12/2019 | Nakagawa | G01F 23/292 |
| 11,125,601 B2* | 9/2021 | Ziegler | G01F 23/14 |
| 11,591,194 B2* | 2/2023 | Whitaker | B66F 7/0666 |
| 2003/0116629 A1* | 6/2003 | Sauve | G06K 19/06009 |
| | | | 235/462.07 |
| 2006/0077376 A1 | 4/2006 | Maroney et al. | |
| 2012/0013889 A1 | 1/2012 | Heise | |
| 2014/0233042 A1* | 8/2014 | Klinec | G01F 23/2921 |
| | | | 356/614 |
| 2015/0062332 A1 | 3/2015 | Lee et al. | |
| 2019/0120682 A1* | 4/2019 | Ziegler | G01F 23/245 |
| 2021/0172725 A1* | 6/2021 | Rein | G01B 11/028 |

FOREIGN PATENT DOCUMENTS

| | | |
|---|---|---|
| FR | 2582804 A1 | 5/1985 |
| WO | 1994/015181 A1 | 7/1994 |

\* cited by examiner

APPARATUS FOR DETERMINING A VERTICAL POSITION OF AT LEAST ONE INTERFACE BETWEEN A FIRST COMPONENT AND AT LEAST ONE SECOND COMPONENT

CROSS-REFERENCE TO RELATED APPLICATIONS

This application claims priority to European Patent Application No. 21174606.0, filed 19 May 2021, the disclosure of which is hereby incorporated by reference in its entirety.

TECHNICAL FIELD

The present disclosure relates to an improved apparatus for determining a vertical position of at least one interface between a first component and at least one second component, the components being comprised as different layers in a sample container, and to a laboratory automation system.

BACKGROUND

US 2012/0013889 A1 discloses an apparatus for determining a vertical position of at least one interface between a first component and at least one second component, the components being comprised as different layers in a sample container or sample tube. The disclosed apparatus comprises a first and a second sensing unit at identical vertical positions.

EP 2 770 317 A1 discloses an apparatus for determining a vertical position of at least one interface between a first component and at least one second component, the components being comprised as different layers in a sample container or sample tube. The apparatus comprises a first sensing unit comprising a first laser diode configured to emit light having a first wavelength, which is substantially transmitted by the sample container and the first component, a first collimating optics adapted to collimate the light having the first wavelength, a first light detector configured to generate a first sensing signal in response to an intensity of light having the first wavelength being applied to the first light detector, a second sensing unit vertically spaced by a given vertical distance from the first sensing unit and comprising a second laser diode configured to emit light having a second wavelength, which is substantially transmitted by the sample container but blocked by the first component, a second collimating optics adapted to collimate the light having the second wavelength, a second light detector configured to generate a second sensing signal in response to an intensity of light having the second wavelength being applied to the second light detector, a driving unit adapted to move the first sensing unit and the second sensing unit relative to the sample container, a position sensing unit adapted to output a position sensing signal indicative of a vertical position of the sample container, and a vertical position determining unit adapted to match the first sensing signal and the second sensing signal, such that first sensing signal and the second sensing signal correspond to identical vertical positions, and calculate the vertical position of the at least one interface in response to the matched sensing signals and the position sensing signal.

Despite the advantages provided by these apparatus, there is still some room for improvements. Particularly, calibration of the laser diodes with respect to a movement of the driving unit along a vertical or z-axis is cumbersome or even impossible. Further, the drive of the driving unit underlies degradation over time and a deviation from its target vertical position may hardly or even not be observed or detected. Still further, a state of the laser diodes may hardly or even not be observed or detected.

It is therefore desirable to provide an improved apparatus for determining a vertical position of at least one interface between a first component and at least one second component which is able to calibrate and periodically re-calibrate the laser with the vertical axis or z-axis driving unit movement, to monitor the state of the drive of the driving unit and make conclusions about the motor state based on the periodic re-calibration data, and to monitor the state of the laser diodes based on the data collected over time during the periodic re-calibrations.

SUMMARY

Although the embodiments of the present disclosure are not limited to specific advantages or functionality, it is noted that in accordance with the present disclosure, an apparatus for determining a vertical position of at least one interface between a first component and at least one second component is provided which is able to calibrate and periodically re-calibrate the laser with the vertical axis or z-axis driving unit movement, to monitor the state of the drive of the driving unit and make conclusions about the motor state based on the periodic re-calibration data, and to monitor the state of the laser diodes based on the data collected over time during the periodic re-calibration.

In accordance with one embodiment, an apparatus is provided for determining a vertical position of at least one interface between a first component and at least one second component, the components being comprised as different layers in a sample container, the apparatus comprising: a first sensing unit comprising a first laser diode configured to emit light having a first wavelength and a first light detector configured to generate a first sensing signal in response to an intensity of light having the first wavelength being applied to the first light detector, a second sensing unit vertically spaced by a given vertical distance from the first sensing unit and comprising a second laser diode configured to emit light having a second wavelength and a second light detector configured to generate a second sensing signal in response to an intensity of light having the second wavelength being applied to the second light detector, a driving unit configured to move the sample container relative to the first sensing unit and the second sensing unit, a position sensing unit configured to output a position sensing signal indicative of a vertical position of the sample container, a vertical position determining unit configured to match the first sensing signal and the second sensing signal such that first sensing signal and the second sensing signal correspond to identical vertical positions, and to determine the vertical position of the at least one interface in response to the matched sensing signals and the position sensing signal, a calibration device comprising a plurality of bars and a plurality of openings arranged between the bars, wherein the driving unit is configured to move the calibration device relative to the first sensing unit and the second sensing unit, wherein the vertical position determining unit is configured to determine a vertical orientation of the driving unit relative to the first sensing unit and the second sensing unit based on the first and second signals generated during a movement of the calibration device relative to the first sensing unit and the second sensing unit.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present description can be best understood when read in conjunction with the following drawings, where like structure is indicated with like reference numerals and in which.

Figure 1:
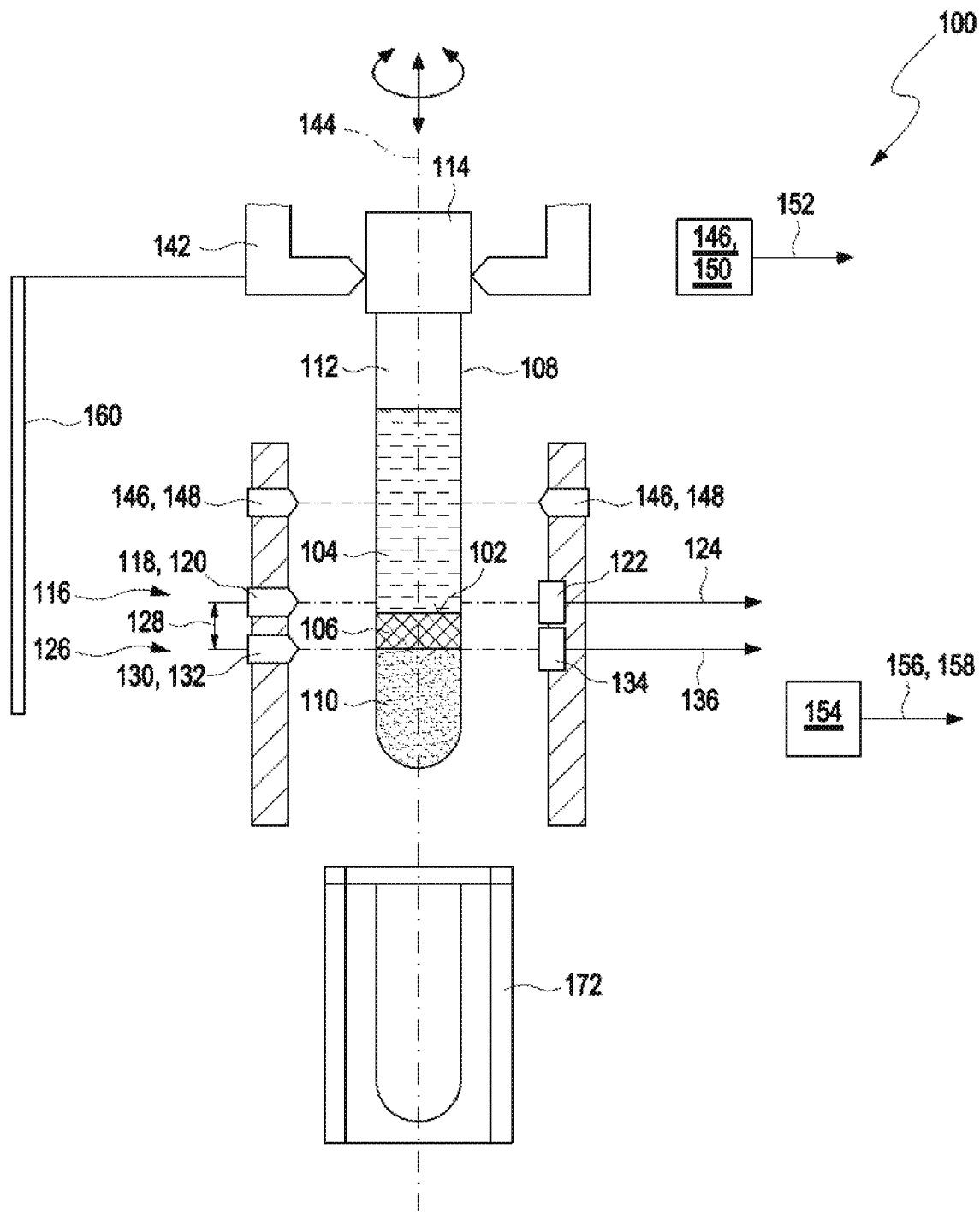
FIG. 1 schematically shows an apparatus for determining a vertical position of at least one interface between a first component and at least one second component being comprised in a sample container.

Skilled artisans appreciate that elements in the figures are illustrated for simplicity and clarity and have not been drawn to scale. For example, dimensions of some of the elements in the figures may be exaggerated relative to other elements to help improve understanding of the embodiment(s) of the present disclosure.

DETAILED DESCRIPTION

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "typically", "more typically", "particularly", "more particularly", "specifically", "more specifically" or similar terms are used in conjunction with optional features, without restricting alternative possibilities. Thus, features introduced by these terms are optional features and are not intended to restrict the scope of the claims in any way. The present disclosure may, as the skilled person will recognize, be performed by using alternative features. Similarly, features introduced by "in an embodiment of the present disclosure" or similar expressions are intended to be optional features, without any restriction regarding alternative embodiments of the present disclosure, without any restrictions regarding the scope of the present disclosure and without any restriction regarding the possibility of combining the features introduced in such way with other optional or non-optional features of the present disclosure.

According to a first aspect of the present disclosure, there is disclosed an apparatus for determining a vertical position of at least one interface between a first component and at least one second component, the components being comprised as different layers in a sample container such as in a conventional transparent sample container or sample tube as used in automated laboratory instrumentation. For example, the apparatus can detect horizontal interfaces between different layers within a centrifuged sample tube containing blood, such as interfaces between a serum or plasma layer and either a separation medium layer (in so called tubes) or a cruor (blood cell) layer.

The apparatus comprises a first sensing unit comprising a first laser diode configured to emit light having a first wavelength and a first light detector configured to generate a first sensing signal in response to an intensity of light having the first wavelength being applied to the first light detector. The first wavelength may be substantially transmitted by the sample container and a first component. The first light detector may be a photodiode or phototransistor that generates a first sensing signal, for example a sensing voltage or sensing current, in response to or indicative of an intensity of light having the first wavelength that reaches the first light detector.

The apparatus further comprises a second sensing unit vertically spaced by a given vertical distance from the first sensing unit and comprising a second laser diode configured to emit light having a second wavelength and a second light detector configured to generate a second sensing signal in response to an intensity of light having the second wavelength being applied to the second light detector. The vertical distance can be specified by design and generally does not change during operation of the apparatus. The second wavelength may be substantially transmitted by a sample container but blocked or absorbed by the first component. The second light detector may be a photodiode or phototransistor that generates a second sensing signal, for example a sensing voltage or sensing current, in response to or indicative of an intensity of light having the second wavelength that reaches the second light detector.

The apparatus further comprises a driving unit configured to move the sample container relative to the first sensing unit and the second sensing unit. The driving unit may comprise a gripper to grip the sample container. The driving unit is configured to move the first sensing unit and the second sensing unit relative to the sample container, either together or separately. In some embodiments, the driving unit provides relative motion between the first sensing unit and the second sensing unit and the sample container in both a substantially vertical direction aligned with a central axis of a (cylindrical) sample container or tube and in a rotational direction about the central axis of the (cylindrical) sample container or tube.

The apparatus further comprises a position sensing unit configured to output a position sensing signal indicative of a vertical position of the sample container such as relative to the first sensing unit, or the second sensing unit, or any other given or know relative position. The relative position can, for example, be defined by a light barrier defining a reference vertical position.

The apparatus further comprises a vertical position determining unit configured to match the first sensing signal and the second sensing signal such that first sensing signal and the second sensing signal correspond to identical vertical positions. The matching reflects that the first sensing unit and the second sensing unit are vertically spaced by the given vertical distance, such that the first sensor signal and the second sensor signal at a given measurement time correspond to different vertical positions of the sample container. The matching may be done by a transformation of vertical position coordinates for one of the sensing signals.

The vertical position determining unit may be further configured to calculate or determine the vertical position of the at least one interface in response to the matched sensing signals and the position sensing signal. After matching, a quotient between the second sensing signal and the first sensing signal (or vice versa) may be evaluated, wherein the quotient may be compared with a given threshold value. A vertical position for which the result of the comparison changes may be determined as a vertical interface position.

Laser diode light sources make it possible to detect component interfaces even when labels are attached to the sample container. It is common practice in laboratories where the disclosed device is to be employed that medical and laboratory personnel will add multiple layers of labels (such as 2, 3, 4 or even 5 or more layers) as a sample is processed to yield an analysis result. However, even with the increased intensity provided by laser diode light sources, the detection limit of the disclosed sensing units can be reached or a less than desirable signal to noise ratio can be observed as the number of labels attached to a sample tube increases. Therefore, in particular embodiments, the disclosed apparatus further includes a mechanism to rotate the relative position of the first sensing unit and the second sensing unit about a vertical axis of a sample tube (or at least substantially about its vertical axis) in order to reduce the number of label layers that the light emitted by the laser diodes must pass through before impinging on the light sensors. For example, the sample tube can be rotated or the first sensing unit and the second sensing unit can be rotated around the sample tube, or both.

The apparatus further comprises a calibration device comprising a plurality of bars and a plurality of openings arranged between the bars. The driving unit is configured to move the calibration device relative to the first sensing unit and the second sensing unit. Thus, the light emitted by the laser diodes may either pass the openings and incident on at least one of the light receivers or be obstructed by the bars. The vertical position determining unit is configured to determine a vertical orientation of the driving unit relative to the first sensing unit and the second sensing unit based on the first and second signals generated during a movement of the calibration device relative to the first sensing unit and the second sensing unit. Thus, the light detected by the light receivers allows to determine the vertical position of the calibration device and the driving unit, respectively. Thereby, the calibration device allows to calibrate and periodically re-calibrate the laser diodes with the vertical axis or z-axis movement of the driving unit.

The bars may be substantially impermeable for light emitted from the first and second laser diodes. Thus, the light emitted by the laser diodes may either pass the openings and incident on at least one of the light receivers or be blocked by the bars allowing to exactly determine a vertical position of the calibration device.

The calibration device may further comprise two beams, wherein the beams are arranged parallel to one another, wherein the bars are connected to or integrally formed with the beams. Thus, the openings may be defined as through holes between the beams and bars.

The calibration device may comprise a longitudinal shape extending along a longitudinal direction, wherein the openings are evenly distributed between the bars in the longitudinal direction. Thus, the calibration device may comprise a shape similar to a sample tube if seen from a lateral point of view which facilitates the handling of the calibration device by the driving unit.

The driving unit may be configured to move calibration device with the longitudinal direction being parallel to a movement direction of the driving unit. Thus, the lateral space required for the movement of the calibration device may be significantly decreased.

The openings and the bars may have identical or different vertical dimensions in a direction parallel to the longitudinal direction. Thus, the calibration process may be exactly carried out as any errors due to deviating sizes of the openings and bars are avoided.

The vertical dimensions may correspond to a minimum optical resolution of the first sensing unit and the second sensing unit. Thus, the openings and bars may be rather small which significantly increases the calibration accuracy.

The driving unit comprises a drive, wherein the apparatus may be configured to detect a state of the drive of the driving unit based on a result of a plurality of determinations of vertical orientations. The drive may be a motor. Thus, the calibration device allows to monitor the health of the drive and make conclusions about the motor health based on the periodic re-calibration data.

The apparatus may be configured to detect a state of the first and second laser diodes based on a result of a plurality of determinations of vertical orientations. Thus, the calibration device allows to monitor the health of the laser diodes based on the data collected over time during the periodic re-calibrations.

The calibration device may be permanently mounted to the driving unit or is releasably connectable to the driving unit. Thus, the calibration device may be built into the driving unit itself such as a gripper, or installed into the apparatus so that the gripper could grab it and pass it through the lasers.

The calibration device may comprise a substantially two-dimensional shape. Thus, the calibration device may be rather flat which decreases the space required for accommodating the calibration device.

The calibration device may be substantially strip-shaped. Thus, the calibration device may be flat and rather narrow which decreases the space required for accommodating the calibration device.

The first sensing unit may further comprise a first collimating optics configured to collimate the light having the first wavelength. Thus, the first sensing unit may further include a first collimating optics adapted to collimate the light of the first wavelength that is generated by the first laser diode, such that the light is emitted in form of a beam having a defined diameter and direction in space. The beam may propagate substantially perpendicular to a vertical axis of the sample container, for example at an angle relative to a vertical axis of the sample container of between 85 degrees and 95 degrees, such as between 89 degrees and 91 degrees. Further, the beam may propagate substantially through the vertical axis of the sample container.

The second sensing unit may further comprise a second collimating optics configured to collimate the light having the second wavelength. Thus, the second sensing unit may further include a second collimating optics adapted to collimate the light of the second wavelength generated by the second laser diode, such that the light is emitted in form of a beam having a defined diameter and direction in space. The beam may propagate substantially perpendicular to a vertical axis of the sample container, for example at an angle relative to the vertical axis of the sample container of between 85 degrees and 95 degrees, such as between 89 degrees and 91 degrees. Further, the beam may propagate substantially through the vertical axis of the sample container. The resulting beam having the second wavelength and the resulting beam having the first wavelength can propagate in a parallel but vertically spaced path separated by a vertical distance between the first and the second sensing units.

Wavelength specific collimation optics optimize the detection performance of the disclosed apparatus compared to devices having shared collimation optics, (i.e., beams of multiple wavelengths share an identical measurement path). Shared collimation optics are typically optimized for one of the wavelengths, and thus have reduced performance for other wavelengths. Alternatively, a compromise is made such that the collimation optics are not optimal for any of the wavelengths. Finally, by using the matching operation the measurement paths which differ due to the vertical spacing of the sensing units are virtually matched or aligned with one another, enabling the conventional interface detection e.g., on a ratio basis between light beams having different wavelengths.

In particular embodiments, the beam generated by the first laser diode and the first collimating optics at the first wavelength and the beam generated by the second laser diode and the second collimating optics at the second wavelength have substantially identical diameters and substantially parallel propagation directions in space. Beams having substantially identical diameters and directions in space function to increase the accuracy of interface detection according to the disclosure.

The first collimating optics may be specifically adapted to the first wavelength and the second collimating optics may be specifically adapted to the second wavelength, e.g., by wave length specific geometric dimensioning, wave length specific materials, etc.

The first and the second components may be selected from a group consisting of air, serum and separation gel.

The first wavelength may range from 400 nm to 1200 nm and the second wavelength may range from 1300 nm to 1700 nm.

The driving unit may be configured to rotate the sample container and/or the calibration device around a vertical axis, wherein the apparatus is configured to repeat the detecting of the vertical position of the at least one interface for the rotated sample container. As such, the apparatus may be adapted to repeat the detecting of the vertical position of the at least one interface for the rotated sample container. This eases the interface detection in case of labels being attached to the sample container, since by means of rotating a measurement path having less label layers may be found, enhancing the signal to noise ratio.

The driving unit may further be adapted to insert the sample container into a sample container carrier, into a sample container conveyor, into a sample aliquoter, into an analytical instrument, etc., wherein the process of interface detection may be simultaneously performed. By performing two tasks, namely interface detection and insertion, in parallel, the overall processing time may be reduced significantly.

The apparatus may further comprise a light barrier configured to detect the introduction of a sample container into the apparatus, wherein the apparatus is configured to activate the first and the second sensing units if the introduction is detected.

According to a second aspect of the present disclosure, a laboratory automation system for processing components comprised in a sample container is disclosed. The system comprises the apparatus according to any one of the embodiments described above or that will be described hereinafter. The system further comprises at least one laboratory station functionally coupled to the apparatus. The system may include different laboratory stations, such as pre analytical stations, analytical stations and post analytical stations. The apparatus and the laboratory station(s) may be functionally coupled be means of a data bus enabling data exchange between the apparatus and the laboratory station(s).

The at least one laboratory station is configured to operate in response to the detected vertical position of the at least one interface.

The laboratory stations may be an aliquoter unit having a pipetting unit, the pipetting unit having a tip, wherein during aliquoting the aliquoter unit is adapted to control a vertical position of the tip in response to the detected vertical position of at least one interface, such that only a desired component is transmitted into secondary tubes.

The system may further include a sample container transport unit adapted to transport sample containers between different laboratory stations. The sample container transport unit comprises a number, e.g., 10 to 200, of sample container carriers. The driving unit is adapted to insert a sample container into a sample container carrier parallel to detecting the vertical position of the at least one interface, thus increasing the overall processing performance.

The sample container transport unit may include a conveyor (belt), wherein the sample container carriers are attached to the conveyor.

The term "sample container" as used herein is a broad term and is to be given its ordinary and customary meaning to a person of ordinary skill in the art and is not to be limited to a special or customized meaning. The term specifically may refer, without limitation, to a device designed as a tube. The sample container is typically made of glass or transparent plastic and typically has an opening at an upper end. The container can be used to contain, store and transport a laboratory sample such as a blood sample, an urine sample or any other chemical sample.

The term "laser diode" as used herein is a broad term and is to be given its ordinary and customary meaning to a person of ordinary skill in the art and is not to be limited to a special or customized meaning. The term specifically may refer, without limitation, to a device that emits light through a process of optical amplification based on the stimulated emission of electromagnetic radiation. A laser differs from other sources of light in that it emits light which is coherent. Spatial coherence allows a laser to be focused to a tight spot, enabling applications such as laser cutting and lithography. Spatial coherence also allows a laser beam to stay narrow over great distances (collimation), enabling applications such as laser pointers and lidar. Lasers can also have high temporal coherence, which allows them to emit light with a very narrow spectrum, i.e., they can emit a single color of light. Alternatively, temporal coherence can be used to produce pulses of light with a broad spectrum but durations as short as a femtosecond ("ultrashort pulses").

The term "light detector" as used herein is a broad term and is to be given its ordinary and customary meaning to a person of ordinary skill in the art and is not to be limited to a special or customized meaning. The term specifically may refer, without limitation, to any device that generates a sensing signal, for example a sensing voltage or sensing current, in response to or indicative of an intensity of light that reaches the light detector. The light detector may particularly be a photodiode or phototransistor.

The term "driving unit" as used herein is a broad term and is to be given its ordinary and customary meaning to a person of ordinary skill in the art, and is not to be limited to a special or customized meaning. The term specifically may refer, without limitation, to any device that is configured to take a sample container and that is adapted to move the first sensing unit and the second sensing unit relative to the sample container, either together or separately. In order to take the sample container, the driving unit may comprise a gripper that grips the sample container. The driving unit may provide relative motion between the first sensing unit and the second sensing unit and the sample container in both a substantially vertical direction aligned with a central axis of a (cylindrical) sample container or tube and in a rotational direction about the central axis of the (cylindrical) sample container or tube. The driving unit may particularly be a so called pick-and-place unit.

The term "position sensing unit" as used herein is a broad term and is to be given its ordinary and customary meaning to a person of ordinary skill in the art, and is not to be limited to a special or customized meaning. The term specifically may refer, without limitation, to any device that is configured to output a position sensing signal indicative of a vertical position of the sample container, e.g., relative to first sensing unit, or the second sensing unit, or any other given or know relative position. The relative position can, for example, be defined by a light barrier defining a reference vertical position.

The term "vertical position determining unit" as used herein is a broad term and is to be given its ordinary and customary meaning to a person of ordinary skill in the art, and is not to be limited to a special or customized meaning. The term specifically may refer, without limitation, to any device that is adapted to match the first sensing signal and the second sensing signal such that first sensing signal and the second sensing signal correspond to substantially identical vertical positions. The matching reflects that the first sensing unit and the second sensing unit are vertically spaced by the given vertical distance, such that the first sensor signal and the second sensor signal at a given measurement time correspond to different vertical positions of the sample container. The matching may be done by a transformation of vertical position coordinates for one of the sensing signals. The vertical position determining unit is further adapted to calculate or determine the vertical position of the at least one interface in response to the matched sensing signals and the position sensing signal.

The term "calibration" as used herein is a broad term and is to be given its ordinary and customary meaning to a person of ordinary skill in the art, and is not to be limited to a special or customized meaning. The term specifically may refer, without limitation, to a comparison of measurement values delivered by a device under test with those of a calibration standard of known accuracy. Such a standard could be another measurement device of known accuracy, a device generating the quantity to be measured such as a voltage, a sound tone, or a physical artifact, such as a meter ruler. The outcome of the comparison can result in one of the following: (a) no significant error being noted on the device under test, (b) a significant error being noted but no adjustment made, (c) an adjustment made to correct the error to an acceptable level. Strictly speaking, the term "calibration" means just the act of comparison and does not necessarily include any subsequent adjustment even though the latter is usually carried out subsequently.

The term "calibration device" as used herein is a broad term and is to be given its ordinary and customary meaning to a person of ordinary skill in the art, and is not to be limited to a special or customized meaning. The term specifically may refer, without limitation, to a device that is used in a process of calibration.

The term "substantially impermeable" as used herein is a broad term and is to be given its ordinary and customary meaning to a person of ordinary skill in the art, and is not to be limited to a special or customized meaning. The term specifically may refer, without limitation, to the characteristics of a constructional member or device to block light to a degree such that only small amounts of light are transmitted which do not have negative impact on the detection result. Thus, this term may refer to the ability of a constructional member or device to block light such that at least 80%, typically 90% and more typically 95% of the light incident thereon are blocked.

The term "collimating optics" as used herein is a broad term and is to be given its ordinary and customary meaning to a person of ordinary skill in the art, and is not to be limited to a special or customized meaning. The term specifically may refer, without limitation, to an optical element that is configured to collimate light. A collimated beam of light or other electromagnetic radiation has parallel rays and, therefore, will spread minimally as it propagates. A perfectly collimated light beam, with no divergence, would not disperse with distance. However, diffraction prevents the creation of any such beam. Light can be approximately collimated by a number of processes, for instance by means of a collimator. Perfectly collimated light is sometimes said to be focused at infinity. Thus, as the distance from a point source increases, the spherical wavefronts become flatter and closer to plane waves, which are perfectly collimated. Laser light from gas or crystal lasers is highly collimated because it is formed in an optical cavity between two parallel mirrors, which constrain the light to a path perpendicular to the surfaces of the mirrors. In practice, gas lasers can use concave mirrors, flat mirrors, or a combination of both. The divergence of high-quality laser beams is commonly less than 1 milliradian (3.4 arcmin), and can be much less for large-diameter beams. Laser diodes emit less-collimated light due to their short cavity, and therefore higher collimation requires a collimating lens as optical element.

The term "aliquot" as used herein is a broad term and is to be given its ordinary and customary meaning to a person of ordinary skill in the art, and is not to be limited to a special or customized meaning. The term specifically may refer, without limitation, to an exact portion of a sample or total amount of a liquid, e.g., exactly 25 mL of water taken from 250 mL.

The term "aliquoter unit" as used herein is a broad term and is to be given its ordinary and customary meaning to a person of ordinary skill in the art, and is not to be limited to a special or customized meaning. The term specifically may refer, without limitation, to any device that is configured to take an aliquot from a sample such as a laboratory sample.

The term "pipetting unit" as used herein is a broad term and is to be given its ordinary and customary meaning to a person of ordinary skill in the art, and is not to be limited to a special or customized meaning. The term specifically may refer, without limitation, to a laboratory tool commonly used in chemistry, biology and medicine to transport a measured volume of liquid, often as a media dispenser. The pipetting unit may be or comprise a pipette. Pipettes come in several designs for various purposes with differing levels of accuracy and precision, from single piece glass pipettes to more complex adjustable or electronic pipettes. Many pipette types work by creating a partial vacuum above the liquid-holding chamber and selectively releasing this vacuum to draw up and dispense liquid. Measurement accuracy varies greatly depending on the instrument.

Further disclosed and proposed herein is a computer program including computer-executable instructions for performing the method according to the present disclosure in one or more of the embodiments enclosed herein when the program is executed on a computer or computer network. Specifically, the computer program may be stored on a computer-readable data carrier and/or on a computer-readable storage medium.

As used herein, the terms "computer-readable data carrier" and "computer-readable storage medium" specifically may refer to non-transitory data storage means, such as a hardware storage medium having stored thereon computer-executable instructions. The computer-readable data carrier or storage medium specifically may be or may comprise a storage medium such as a random-access memory (RAM) and/or a read-only memory (ROM).

Thus, specifically, one, more than one or even all of operation method steps as indicated above may be performed by using a computer or a computer network, typically by using a computer program.

Further disclosed and proposed herein is a computer program product having program code means, in order to perform the method according to the present disclosure in one or more of the embodiments enclosed herein when the program is executed on a computer or computer network. Specifically, the program code means may be stored on a computer-readable data carrier and/or on a computer-readable storage medium.

Further disclosed and proposed herein is a data carrier having a data structure stored thereon, which, after loading into a computer or computer network, such as into a working memory or main memory of the computer or computer network, may execute the method according to one or more of the embodiments disclosed herein.

Further disclosed and proposed herein is a computer program product with program code means stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier and/or on a computer-readable storage medium. Specifically, the computer program product may be distributed over a data network.

Finally, disclosed and proposed herein is a modulated data signal, which contains instructions readable by a computer system or computer network, for performing the method according to one or more of the embodiments disclosed herein.

Referring to the computer-implemented aspects of the present disclosure, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

Specifically, further disclosed herein are:

a computer or computer network comprising at least one processor, wherein the processor is adapted to perform the method according to one of the embodiments described in this description, a computer loadable data structure that is adapted to perform the method according to one of the embodiments described in this description while the data structure is being executed on a computer, a computer program, wherein the computer program is adapted to perform the method according to one of the embodiments described in this description while the program is being executed on a computer, a computer program comprising program means for performing the method according to one of the embodiments described in this description while the computer program is being executed on a computer or on a computer network, a computer program comprising program means according to the preceding embodiment, wherein the program means are stored on a storage medium readable to a computer, a storage medium, wherein a data structure is stored on the storage medium and wherein the data structure is adapted to perform the method according to one of the embodiments described in this description after having been loaded into a main and/or working storage of a computer or of a computer network, and a computer program product having program code means, wherein the program code means can be stored or are stored on a storage medium, for performing the method according to one of the embodiments described in this description, if the program code means are executed on a computer or on a computer network.

Summarizing and without excluding further possible embodiments, the following embodiments may be envisaged:

Embodiment 1: An apparatus for determining a vertical position of at least one interface between a first component and at least one second component, the components being comprised as different layers in a sample container, the apparatus comprising:

a first sensing unit comprising a first laser diode configured to emit light having a first wavelength and a first light detector configured to generate a first sensing signal in response to an intensity of light having the first wavelength being applied to the first light detector, a second sensing unit vertically spaced by a given vertical distance from the first sensing unit and comprising a second laser diode configured to emit light having a second wavelength and a second light detector configured to generate a second sensing signal in response to an intensity of light having the second wavelength being applied to the second light detector, a driving unit configured to move the sample container relative to the first sensing unit and the second sensing unit, a position sensing unit configured to output a position sensing signal indicative of a vertical position of the sample container, a vertical position determining unit configured to match the first sensing signal and the second sensing signal such that first sensing signal and the second sensing signal correspond to identical vertical positions, and to determine the vertical position of the at least one interface in response to the matched sensing signals and the position sensing signal, a calibration device comprising a plurality of bars and a plurality of openings arranged between the bars, wherein the driving unit is configured to move the calibration device relative to the first sensing unit and the second sensing unit, wherein the vertical position determining unit is configured to determine a vertical orientation of the driving unit relative to the first sensing unit and the second sensing unit based on the first and second signals generated during a movement of the calibration device relative to the first sensing unit and the second sensing unit.

Embodiment 2: The apparatus according to the preceding embodiment, wherein the bars are substantially impermeable for light emitted from the first and second laser diodes.

Embodiment 3: The apparatus according to any preceding embodiment, wherein the calibration device further comprises two beams, wherein the beams are arranged parallel to one another, wherein the bars are connected to or integrally formed with the beams.

Embodiment 4: The apparatus according to any preceding embodiment, wherein the calibration device comprises a longitudinal shape extending along a longitudinal direction, wherein the openings are evenly distributed between the bars in the longitudinal direction.

Embodiment 5: The apparatus according to the preceding embodiment, wherein the driving unit is configured to move calibration device with the longitudinal direction being parallel to a movement direction of the driving unit.

Embodiment 6: The apparatus according to embodiment 4 or 5, wherein the openings and the bars have identical or different vertical dimensions in a direction parallel to the longitudinal direction.

Embodiment 7: The apparatus according to the preceding embodiment, wherein the vertical dimensions correspond to a minimum optical resolution of the first sensing unit and the second sensing unit.

Embodiment 8: The apparatus according to any preceding embodiment, wherein the driving unit comprises a drive, wherein the apparatus is configured to detect a state of the drive of the driving unit based on a result of a plurality of determinations of vertical orientations.

Embodiment 9: The apparatus according to any preceding embodiment, wherein the apparatus is configured to detect a state of the first and second laser diodes based on a result of a plurality of determinations of vertical orientations.

Embodiment 10: The apparatus according to any preceding embodiment, wherein the calibration device is permanently mounted to the driving unit or is releasably connectable to the driving unit.

Embodiment 11: The apparatus according to any preceding embodiment, wherein the calibration device comprises a substantially two-dimensional shape.

Embodiment 12: The apparatus according to any preceding embodiment, wherein the calibration device is substantially strip-shaped.

Embodiment 13: The apparatus according to any preceding embodiment, wherein the first sensing unit further comprises a first collimating optics configured to collimate the light having the first wavelength, wherein the second sensing unit further comprises a second collimating optics configured to collimate the light having the second wavelength.

Embodiment 14: The apparatus according to the preceding embodiment, wherein the first collimating optics is specifically adapted to the first wavelength and the second collimating optics is specifically adapted to the second wavelength.

Embodiment 15: The apparatus according to any preceding embodiment, wherein the vertical position determining unit is configured to calculate the vertical position of the at least one interface using a ratio between the matched sensing signals.

Embodiment 16: The apparatus according to any preceding embodiment, wherein the first and the second components are selected from a group consisting of air, serum and separation gel.

Embodiment 17: The apparatus according to any preceding embodiment, wherein the first wavelength ranges between 400 nm and 1200 nm and the second wavelength ranges between 1300 nm and 1700 nm.

Embodiment 18: The apparatus according to any preceding embodiment, wherein the driving unit is configured to rotate the sample container and/or the calibration device around a vertical axis, wherein the apparatus is configured to repeat the detecting of the vertical position of the at least one interface for the rotated sample container.

Embodiment 19: The apparatus according to any preceding embodiment, wherein the driving unit is configured to insert the sample container into a sample container carrier.

Embodiment 20: The apparatus according to any preceding embodiment, further comprising a light barrier configured to detect the introduction of a sample container into the apparatus, wherein the apparatus is configured to activate the first and the second sensing units if the introduction is detected.

Embodiment 21: A laboratory automation system for processing components comprised in a sample container, comprising the apparatus according to any preceding embodiment, and at least one laboratory station functionally coupled to the apparatus, wherein the at least one laboratory station is configured to operate in response to the detected vertical position of the at least one interface.

Embodiment 22: The system according to the preceding embodiment, wherein at least one of the laboratory stations is an aliquoter unit having a pipetting unit, the pipetting unit having a tip, wherein during aliquoting the aliquoter unit is adapted to control a vertical position of the tip in response to the detected vertical position of the at least one interface.

Embodiment 23: The system according to embodiment 21 or 22, further comprising a sample container transport unit adapted to transport the sample container between different laboratory stations, wherein the sample container transport unit comprises a number of sample container carriers, wherein the driving unit is adapted to insert a sample container into a sample container carrier parallel to detecting the vertical position of the at least one interface.

Embodiment 24: The system according to the preceding embodiment, wherein in the sample container transport unit comprises a conveyor, the sample container carriers being attached to the conveyor.

Further optional features and embodiments will be disclosed in more detail in the subsequent description of embodiments, typically in conjunction with the dependent claims. Therein, the respective optional features may be realized in an isolated fashion as well as in any arbitrary feasible combination, as the skilled person will realize. The scope of the present disclosure is not restricted by the typical embodiments.

In order that the embodiments of the present disclosure may be more readily understood, reference is made to the following examples, which are intended to illustrate the disclosure, but not limit the scope thereof.

FIG. 1 schematically shows an apparatus 100 for determining a vertical position of an interface 102 between a first component 104 in form of (blood) serum and a second component 106 in form of a separating medium, e.g., in form of a gel. The components 104 and 106 are comprised as different layers in a sample container 108 or sample tube. The sample container 108 may further comprise a third component 110 in form of cruor (blood cells) at the bottom and a fourth component 112 in form of air at the top. The sample container 108 is closed by means of a removable cap 114.

The apparatus 100 comprises a first sensing unit 116 comprising a first laser diode 118 configured to emit light having a first wavelength of 800 nm. Light having this wavelength is substantially transmitted by the material of the sample container 108 and the first component 104, i.e., the serum in this example. The first sensing unit 116 further comprises a corresponding first collimating optics 120 which is configured to collimates the light having the first wavelength such that a vertical light beam having a diameter of approximately 0.8 mm is generated, such that the light beam propagates through the sample container 108 and the respective component along a vertical measurement path. The first sensing unit 116 further comprises a first light detector 122 in form of a photo diode, which is arranged at a vertical level which is the same as the vertical level of the first laser diode 118. The first light detector 122 is configured to generate a first sensing signal 124 in response to an intensity of light having the first wavelength being applied to the first light detector 122.

The apparatus 100 further comprises a second sensing unit 126 vertically spaced by a given vertical distance 128, e.g., approximately 10 mm, from the first sensing unit 116. The second sensing unit 126 comprises a second laser diode 130 configured to emit light having a second wavelength of 1550 nm. Light having this wavelength is substantially transmitted by the material of the sample container 108 but blocked or absorbed by the first component 104, i.e., the serum in this example. The second sensing unit 126 further comprises a corresponding second collimating optics 132 which is configured to collimate the light having the second wavelength such that a vertical light beam having a diameter of approximately 0.8 mm is generated propagating through the sample container 108 and the respective component along a vertical measurement path. The second sensing unit 126 further comprises second light detector 134 in form of a photo diode, which is arranged at a vertical level which is the same as the vertical level of the second laser diode 130. The second light detector 134 is configured to generate a second sensing signal 136 in response to an intensity of light having the second wavelength being applied to the second light detector 134.

Figure 2:
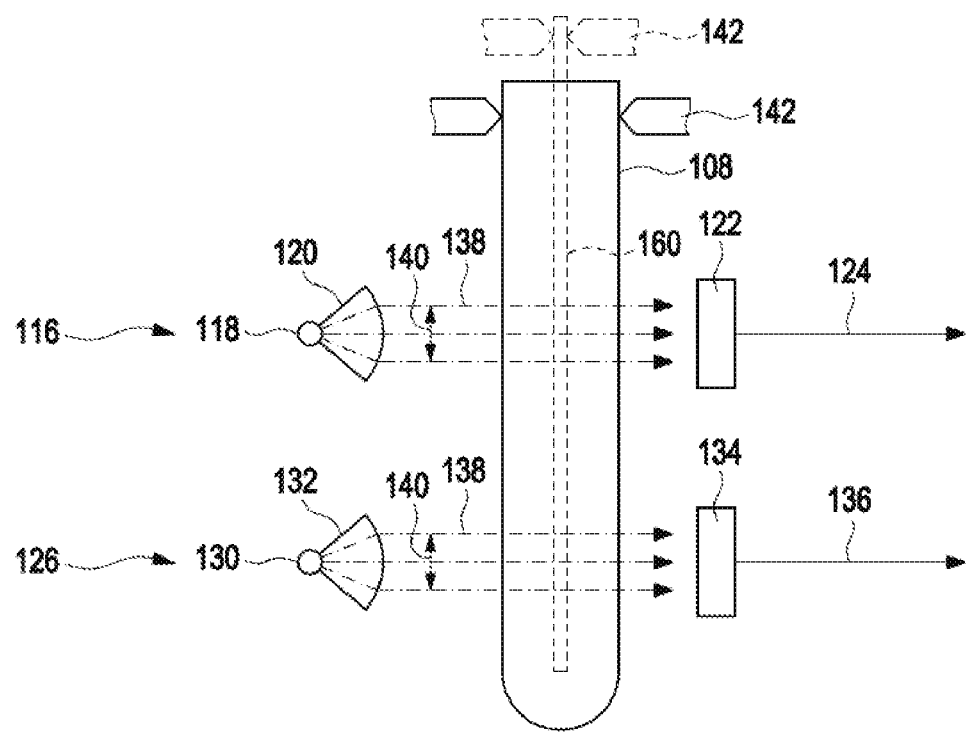
FIG. 2 schematically illustrates light beams generated using collimating optics.

FIG. 2 schematically illustrates light beams 138 generated using the collimating optics 120 and 132, respectively. As depicted, as a result of the collimating optics 120 and 132 the beam generated by the first laser diode 118 at the first wavelength and the beam generated by the second laser diode 130 at the second wavelength have substantially identical diameters 140 and substantially parallel propagation directions in space. Beams having substantially identical diameters and directions in space function to increase the accuracy of interface detection compared with embodiments having no collimation optics.

As is further shown in FIG. 1, the apparatus 100 further comprises a driving unit 142 for vertically moving the sample container 108 relative to the first and second sensing units 116 and 126. The driving unit 142 may be in form of a pick-and-place unit. The driving unit 142 is further configured to rotate the sample container 108 around a vertical axis 144 of the sample container 108.

The apparatus 100 further comprises a position sensing unit 146 in form of a light barrier 148 and a path sensor 150. The path sensor 150 is functionally coupled to the driving unit 142 and measures a vertical distance of a movement caused by the driving unit 142. If the driving unit 142 vertically moves the sample container 108 from a vertical level above the light barrier 148 towards the light barrier 148, the light barrier 148 detects when the sample container 108 disrupts the light path of the light barrier 148. This vertical position may be defined as a zero or reference position, i.e., a position sensing signal 152 output from the position sensing unit (here path sensor 150) for this reference position has a defined reference value, e.g., zero. Thus, the position sensing unit outputs a position sensing signal 152 indicative of a vertical position of the sample container 108, wherein the vertical position of the light barrier 148 is defined as a vertical reference position.

The apparatus 100 further comprises a vertical position determining unit 154. The vertical position determining unit 154 may be in form of a microprocessor. The vertical position determining unit 154 is functionally coupled to the first and the second sensing units 116 and 126, the driving unit 142 and the position sensing unit 146. The vertical position determining unit 154 is configured to control the driving unit 142 such that the sample container 108 is sampled along a vertical measurement path. The resulting first sensing signal 124 and the resulting second sensing signal 136 may be represented in intensity units as a function of the position sensing signal 152. To simplify, the value of the position sensing signal 152=0 may be chosen such that it corresponds to the bottom end of the sample container 108. It has to be noted that the first and second sensing signals 124 and 134 are horizontally misaligned by the position sensing signal 152 having a value corresponding to the vertical distance 128 between the sensing units 116 and 126. Light having the first wavelength and light having the second wavelength is respectively blocked or absorbed by the third component 110 and respectively transmitted by the separating medium 104 and air 112. Only the first component 104 has transmission characteristics depending of the chosen wavelength. Light having the first wavelength is transmitted by the first component 104 but light having the second wavelength is blocked or absorbed by the first component 104. Before analyzing the sensing signals 124 and 134, the vertical position determining unit 154 matches the first sensing signal 124 and the second sensing signal 136. To achieve this, the vertical position determining unit 154 horizontally shifts the second sensing signal 136 to the left by a value of the position sensing signal 152 corresponding to the vertical distance 128, resulting in a matched sensing signal 156. In this respect, there is more to the alignment than just a vertical translation. Due to the deceleration of the driving unit 142 at the end of the movement, i.e., before setting the sample container 108 in a transport unit, a non-linear correction is needed for the last or lowermost part of the measurement. After matching the sensing signals 124 and 136, the vertical position determining unit 154 computes a quotient 158 (including signal smoothing, limiting, etc.) between the matched second sensing signal 154 and the first sensing signal 124, wherein the quotient 158 is compared with a given threshold value. A vertical position for which the result of the comparison changes is determined as a vertical interface position. As such, the vertical positions of the interfaces between the components 112, 104 and 104, 106 are computable. Further details regarding this aspect of the computing reference are provided by US 2012/0013889 A1, the disclosure of which is hereby incorporated herein by reference. The computed vertical interface positions may be used in further processing, e.g., when pipetting the sample container 108.

If labels are glued to the sample container 108, the sensing signals 124 and 136 may not have sufficient signal strength. In this case, the driving unit 142 may rotate the sample container 108 around the vertical axis 144 of the sample container 108 to cause a measurement path eventually crossing a decreased number of label layers and may repeat the measurement. As such, a measurement path having less label layers may be found, thus increasing the signal-to-noise ratio if the sensing signals.

Figure 3:
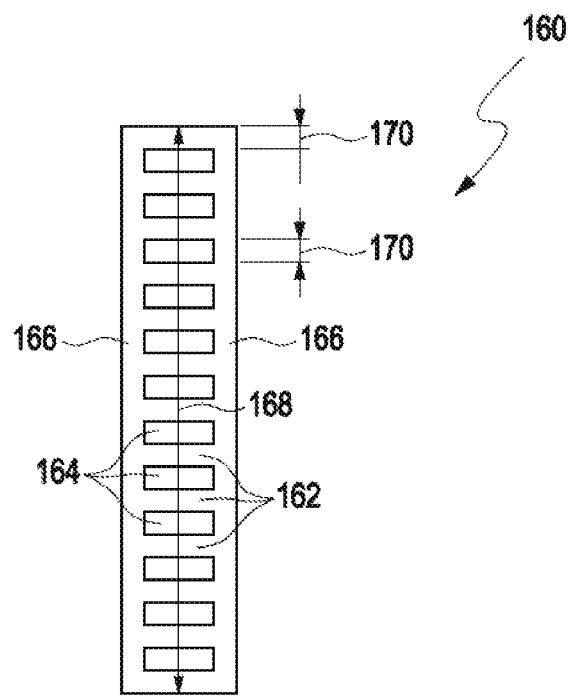
FIG. 3 shows a lateral view of a calibration device.

FIG. 3 shows a lateral view of a calibration device 160 of the apparatus 100. The calibrations device 160 comprises a plurality of bars 162 and a plurality of openings 164 arranged between the bars 162. The bars 162 are substantially impermeable for light emitted from the first and second laser diodes 118, 130. The calibration device 160 further comprises two beams 166. The beams 166 are arranged parallel to one another. The bars 162 are connected to or integrally formed with the beams 166. The calibration device 160 comprises a longitudinal shape extending along a longitudinal direction 168. The openings 164 are evenly distributed between the bars 162 in the longitudinal direction 168. The openings 164 and the bars 162 have identical vertical dimensions 170 in a direction parallel to the longitudinal direction 168. It is explicitly stated that the openings 164 and the bars 162 may have different vertical dimensions 170 in a direction parallel to the longitudinal direction 168 as appropriate. Depending on the situation, it may be necessary to have large openings 164 and small bars 162 or vice versa. Different distances, e.g., a gradient, may also help in establishing the dynamic sensing range of the laser diodes 118, 130. The vertical dimensions 170 correspond to a minimum optical resolution of the first sensing unit 116 and the second sensing unit 126. With other words, the bars 162 and the openings 164 need to be as tall along the longitudinal direction 168 as the minimum theoretical optical resolution of the laser diodes 118, 130, which is 2 mm for example. As shown in FIG. 3, the calibration device 160 comprises a substantially two-dimensional shape. Particularly, the calibration device 160 is substantially strip-shaped. The calibration device 160 is releasably connectable to the driving unit 142. For example, the driving unit 142 may comprise a gripper, which can grip the calibration device 160 at a predetermined position. Alternatively, the calibration device 160 may be permanently or releasably mounted to the driving unit 142 as shown in FIG. 1.

With this construction, the driving unit 142 is configured to move the calibration device 160 instead of a sample container 108 relative to the first sensing unit 116 and the second sensing unit 126 as shown in FIG. 2. Particularly, the driving unit 142 is configured to move calibration device 160 with the longitudinal direction 168 being parallel to a movement direction of the driving unit 142. Further, the vertical position determining unit 154 is configured to determine a vertical orientation of the driving unit 142 relative to the first sensing unit 116 and the second sensing unit 126 based on the first and second signals 124, 136 generated during a movement of the calibration device 160 relative to the first sensing unit 116 and the second sensing unit 126 as will be explained in further detail below.

The vertical orientation of the driving unit 142 relative to the first sensing unit 116 and the second sensing unit 126 may be determined in order to carry out a calibration of the vertical position of the driving unit 142. For this purpose, the driving unit 142 takes or grips the calibration device 160 and move the calibration device 160 relative to the first sensing unit 116 and the second sensing unit 126. Particularly, the driving unit 142 moves the calibration device 160 along the direction in which the first sensing unit 116 and the second sensing unit 126 are vertically arranged. More particularly, the driving unit 142 moves the calibration device 160 between the first and second laser diodes 118, 130 and the first and second light detectors 122, 134. This movement may include a lowering and/or raising or lifting of the calibration device 160. Further, the first and second laser diodes 118, 130 are operated so as to emit light towards the first and second light detectors 122, 134. Thus, during this movement, the calibration device 160 intersects the emitted light. The vertical position of the calibration device 160 may be determined as light of the first and second light detectors 122, 134 is either blocked by the bars 162 or may pass through the openings 164 and be detected by the first and second light detectors 122, 134. More particularly, the following scenarios are possible. A first scenario is that the light emitted from the first laser diode 118 and the second laser diodes 130 is blocked by the bars 162 such that none of the first and second light detectors 122, 134 detects light. A second scenario is that the light emitted from one of the first laser diode 118 and the second laser diodes 130 is blocked by one of the bars 162 such that the first light detector 122 or the second light detector 134 detects light. A third scenario is that the light emitted from the first laser diode 118 and the second laser diodes 130 is not blocked by the bars 162 but passes the openings 164 such that the first light detector 122 and the second light detector 134 detects light. As the vertical dimensions of the bars 162 and openings 164 are known, the vertical position of the driving unit 142 relative to the first sensing unit 116 and the second sensing unit 126 may be exactly determined and calibrated if necessary. With other words, the calibration device 160 may be used to calibrate and periodically re-calibrate the first and second laser diodes 118, 130 with the movement of the driving unit 142 along the vertical direction.

At regular intervals, the driving unit 142 with its gripper would pass this pattern provided by the calibration device 160 through the laser beams, for instance at each start up, daily monthly, or as appropriate. The initial calibration during installation should not be based on one measurement, but multiple, such as 10. This would then serve as a baseline for the speed of the drive of the driving unit 142 along the vertical direction, the intensity of the lasers and the resolution of the system. With measurements at regular intervals, comparison to the baseline and tracking of the changes over time, valuable information about the performance of these systems over time may be obtained and it can be detected that when, for instance, the drive of the driving unit 142 starts to slow down that it needs to be changed, well before it actually burns out. This would help maintain high quality results from the laser inspection unit.

The calibration device 160 may be used for further calibration purposes as will be explained in further detail below. For example, the apparatus 100 is configured to detect a state of a drive (not shown in detail) such as a motor of the driving unit 142 based on a result of a plurality of determinations of vertical orientations. With other words, the apparatus 100 can monitor the state of the drive of the driving unit 142 and make conclusions about the drive state based on the periodic re-calibration data. Further, the apparatus 100 is configured to detect a state of the first and second laser diodes 118, 130 based on a result of a plurality of determinations of vertical orientations. With other words, the apparatus 100 can monitor the state of the first and second laser diodes 118, 130 based on the data collected over time during the periodic re-calibrations.

The apparatus 100 may optionally comprise the following modifications. The driving unit 142 may be further configured to insert the sample container 108 into a conventional sample container carrier 172. By performing two tasks, namely interface detection and carrier insertion, in parallel, the overall processing time may be reduced.

Figure 4:
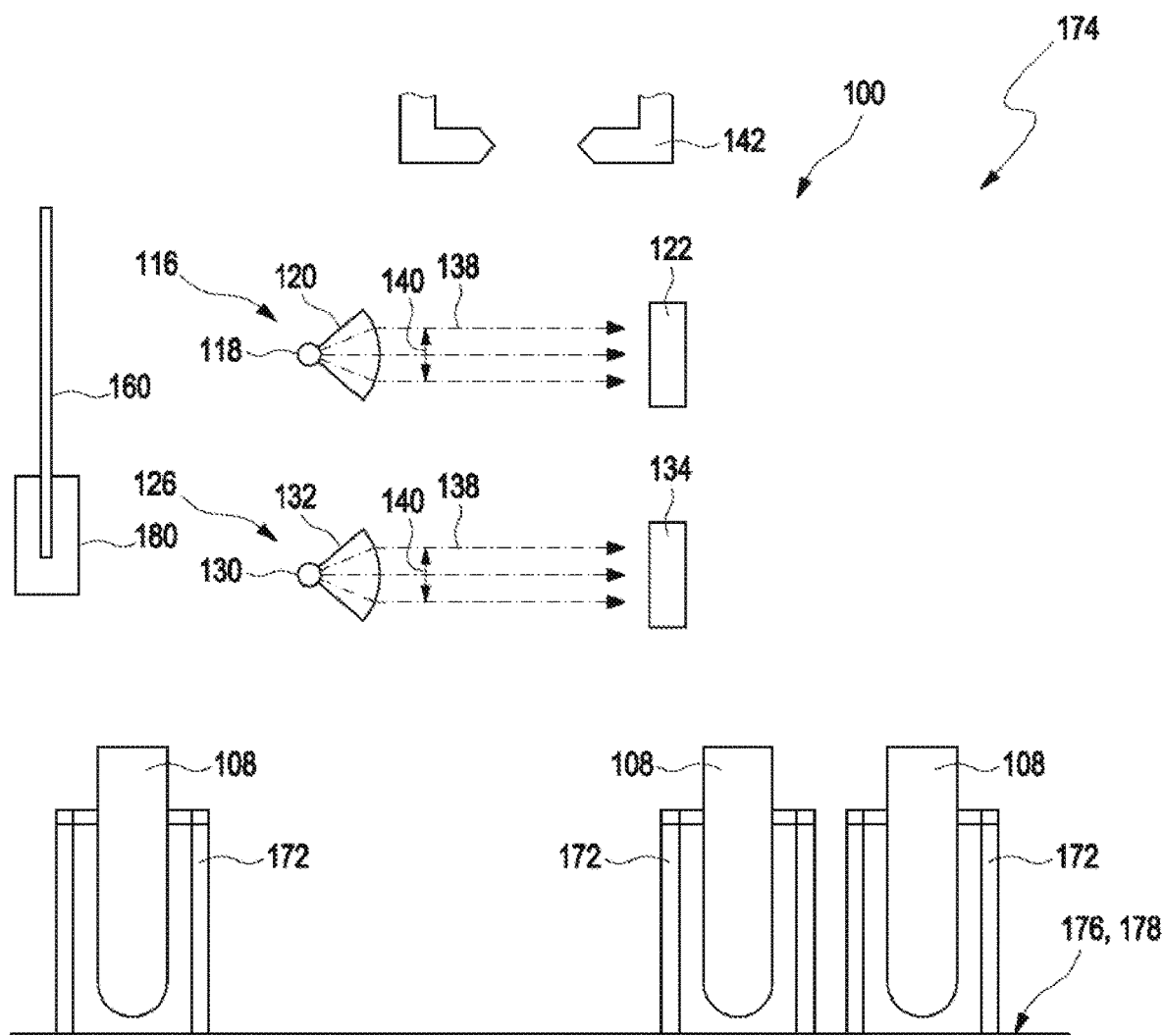
FIG. 4 schematically shows a laboratory automation system.

FIG. 4 schematically shows a laboratory automation system 174. The laboratory automation system 174 comprises the apparatus 100. Such a laboratory automation system may further comprise a centrifuge, and an exemplary laboratory station in form of an aliquoter unit (not shown in detail). The apparatus 100 and the aliquoter unit may be functionally coupled by means of a conventional data or field bus. Self-evidently, the system may include further laboratory stations, such as pre analytical stations, analytical stations and post analytical stations.

The sample containers 108 are supplied after being centrifuged by means of the centrifuge or already centrifuged within racks. The aliquoter unit transfers part of the serum to one or more secondary tubes (not shown in detail). The aliquoter unit conventionally includes a pipetting unit (not shown in detail), the pipetting unit having a tip (not shown in detail), wherein during aliquoting the aliquoter unit is adapted to control a vertical position of the tip in response to the detected vertical position of the interface 102, such that the tip remains within the serum above the separating medium.

The laboratory automation system 174 further includes a sample container transport unit 176 adapted to transport sample containers 108 between the apparatus 100, the aliquoter unit and further laboratory stations (not shown in detail). The sample container transport unit 176 includes a number of sample container carriers 172 and a conveyor 178, wherein the sample container carriers 172 are attached to the conveyor 178. For example, the sample container carriers 172 are a rack configured to receive a plurality of sample containers 108.

The driving unit driving unit 142 includes a gripper (not shown in detail) to grip the sample container 108. The driving unit or driving unit 142 further includes means to provide a relative motion between the first sensing unit and the second sensing unit 116 and 126 and the sample container 108 in both a substantially vertical direction aligned with the vertical axis 144 of the cylindrical sample container 108 and in a rotational direction about the vertical axis 144 of the sample container 108.

The driving unit or driving unit 142 inserts a sample container 108 into a corresponding sample container carrier 172, wherein the apparatus 100 simultaneously detects the vertical position of the interface 102. During insertion the conveyor is stopped. After insertion the conveyor is moved such that an empty sample container carrier 172 is placed under the driving unit 142, such that a further sample container 108 may be inserted into the empty sample container carrier 172.

As mentioned above, the calibration device 160 is releasably connectable to the driving unit 142. For example, the driving unit 142 may comprise a gripper that can grip the calibration device 160 at a predetermined position instead of a sample container 108. As shown in FIG. 4, the predetermined position may be defined by a holding device 180 configured to hold the calibration device 160 when not engaged by the driving unit 142. As shown in FIG. 4, the holding device 180 may be shaped in that the calibration device 160 may be inserted therein by means of the driving unit 142. For example, the holding device 180 is shaped similar to a container or vessel having an opening at its top end through which the calibration device 160 may be inserted. Alternatively, the holding device 180 may be any device configured to hold the calibration device 160 such as a magnet if the calibration device 160 is made of a magnetic material.

| List of reference numbers | |
|---|---|
| 100 | apparatus |
| 102 | interface |
| 104 | first component |
| 106 | second component |
| 108 | sample container |
| 110 | third component |
| 112 | fourth component |
| 114 | cap |
| 116 | first sensing unit |
| 118 | first laser diode |
| 120 | first collimating optics |
| 122 | first light detector |
| 124 | first sensing signal |
| 126 | second sensing unit |
| 128 | vertical distance |
| 130 | second laser diode |
| 132 | second collimating optics |
| 134 | second light detector |
| 136 | second sensing signal |
| 138 | light beam |
| 140 | diameter |
| 142 | driving unit |
| 144 | vertical axis |
| 146 | position sensing unit |
| 148 | light barrier |
| 150 | path sensor |
| 152 | position sensing signal |
| 154 | vertical position determining unit |
| 156 | matched sensing signal |
| 158 | quotient |
| 160 | calibration device |
| 162 | bar |
| 164 | opening |
| 166 | beam |
| 168 | longitudinal direction |
| 170 | vertical dimension |
| 172 | sample container carrier |
| 174 | laboratory automation system |
| 176 | transport unit |
| 178 | conveyor |
| 180 | holding device |

What is claimed is:

1. An apparatus for determining a vertical position of at least one interface between a first component and at least one second component, the components being comprised as different layers in a sample container, the apparatus comprising:
    a first sensing unit comprising a first laser diode configured to emit light having a first wavelength and a first light detector configured to generate a first sensing signal in response to an intensity of light having the first wavelength being applied to the first light detector,
    a second sensing unit vertically spaced by a given vertical distance from the first sensing unit and comprising a second laser diode configured to emit light having a second wavelength and a second light detector configured to generate a second sensing signal in response to an intensity of light having the second wavelength being applied to the second light detector,
a driving unit configured to move the sample container relative to the first sensing unit and the second sensing unit,
a position sensing unit configured to output a position sensing signal indicative of a vertical position of the sample container,
a vertical position determining unit configured to match the first sensing signal and the second sensing signal such that first sensing signal and the second sensing signal correspond to identical vertical positions, and to determine the vertical position of the at least one interface in response to the matched sensing signals and the position sensing signal,
a calibration device comprising a plurality of bars and a plurality of openings arranged between the bars,
wherein the driving unit is configured to move the calibration device relative to the first sensing unit and the second sensing unit,
wherein the vertical position determining unit is configured to determine a vertical orientation of the driving unit relative to the first sensing unit and the second sensing unit based on the first and second signals generated during a movement of the calibration device relative to the first sensing unit and the second sensing unit.

2. The apparatus according to claim 1, wherein the bars are substantially impermeable for light emitted from the first and second laser diodes.

3. The apparatus according to claim 1, wherein the calibration device further comprises two beams, wherein the beams are arranged parallel to one another, wherein the bars are connected to or integrally formed with the beams.

4. The apparatus according to claim 1, wherein the driving unit comprises a drive, wherein the apparatus is configured to detect a state of the drive of the driving unit based on a result of a plurality of determinations of vertical orientations.

5. The apparatus according to claim 1, wherein the apparatus is configured to detect a state of the first and second laser diodes based on a result of a plurality of determinations of vertical orientations.

6. The apparatus according to claim 1, wherein the calibration device is permanently mounted to the driving unit or is releasably connectable to the driving unit.

7. The apparatus according to claim 1, wherein the calibration device comprises a substantially two-dimensional shape.

8. The apparatus according to claim 1, wherein the calibration device is substantially strip-shaped.

9. The apparatus according to claim 1, wherein the first sensing unit further comprises a first collimating optics configured to collimate the light having the first wavelength, wherein the second sensing unit further comprises a second collimating optics configured to collimate the light having the second wavelength.

10. The apparatus according to claim 1, wherein the first wavelength ranges between 400 nm and 1200 nm and the second wavelength ranges between 1300 nm and 1700 nm.

11. A laboratory automation system for processing components comprised in a sample container, comprising the apparatus according to claim 1, and at least one laboratory station functionally coupled to the apparatus, wherein the at least one laboratory station is configured to operate in response to the detected vertical position of the at least one interface.

12. The apparatus according to claim 1, wherein the calibration device comprises a longitudinal shape extending along a longitudinal direction, wherein the openings are evenly distributed between the bars in the longitudinal direction.

13. The apparatus according to claim 12, wherein the driving unit is configured to move calibration device with the longitudinal direction being parallel to a movement direction of the driving unit.

14. The apparatus according to claim 12, wherein the openings and the bars have identical or different vertical dimensions in a direction parallel to the longitudinal direction.

15. The apparatus according to claim 14, wherein the vertical dimensions correspond to a minimum optical resolution of the first sensing unit and the second sensing unit.

* * * * *